United States Patent Office 3,050,568
Patented Aug. 21, 1962

3,050,568
SELECTIVE CHLORINATION PROCESS
Robert P. Arganbright, Galveston, Tex., assignor to Monsanto Chemical Company, St. Louis, Mo., a corporation of Delaware
No Drawing. Filed Aug. 17, 1959, Ser. No. 833,912
3 Claims. (Cl. 260—654)

The present invention relates to a method for the selective chlorination of butadiene in a mixture of butadiene-containing hydrocarbons of the $C_4$ series.

It is known that olefins may be chlorinated by the so-called oxidative chlorination technique, i.e., by reacting them with hydrogen chloride and oxygen or air in the presence of an oxidation catalyst. The prior art teaches that both butylenes or butenes and butadiene may be so reacted to yield various chlorinated butylenes and chlorobutadienes such as chloroprene. It has now been discovered that under certain conditions, a mixture containing butenes and butadiene may be subjected to oxidative chlorination and only the butadiene therein will be chlorinated, the butenes remaining substantially unaffected by the reaction. This is an important development in view of the fact that it facilitates the preparation of chlorinated butadienes without the necessity for separation of the $C_4$ hydrocarbons prior to the chlorination reaction. One of the methods for producing butadiene-1,3 consists in subjecting n-butenes to elevated dehydrogenating temperatures in the presence of a catalyst which results in converting a portion of the butenes into butadiene and hydrogen. The removal of hydrogen from the products may be easily accomplished by well known rectification methods. However, the separation of butadiene from unreacted butenes by rectification is exceedingly difficult, impractical and uneconomical because of the closeness of their boiling points. Hence, prior to the present invention, the usual practice was to separate the butadiene for clorination by using extraction techniques. While these techniques are effective, they are also cumbersome and expensive and the advantages of eliminating such a purification are immediately obvious. Similarly, in a recently developed process for the preparation of butadiene by oxidative chlorination of n-butenes, the butadiene is obtained in admixture with unreacted butenes. Here, the process of the present invention provides a means for readily isolating the butenes for recycle and simultaneously converting the butadiene to chlorinated products making possible a relatively simple integrated process for the production of dichlorobutenes and butadiene from butenes.

It is an object of the present invention to provide a process for selectively chlorinating butadiene in a mixture of butadiene and butenes. Another object is to provide a method for the selective removal of butadiene from a mixture containing it together with butenes. These and other objects and advantages of the invention which will become apparent from the description which follows are attained by reacting a gaseous mixture of butadiene and butenes with hydrogen chloride and oxygen (or air) at a temperature in the range from about 220° C. to about 400° C. in contact with a catalyst consisting essentially of cupric chloride supported upon pumice. The invention is illustrated in the following examples which, however, are not to be construed as limiting it any manner whatsoever.

Example 1

A tubular reactor about 4 ft. long and 40 mm. in diameter wrapped with Nichrome wire for heating and covered with asbestos insulation was employed as the reactor. A thermowell containing a thermocouple for measuring temperatures was centrally positioned in the reactor extending throughout its length. The catalyst (about 225 ml.) consisting of cupric chloride supported upon pumice was charged to the reactor and fluidized by passing nitrogen up through it while the reactor was brought up to reaction temperature. Thereafter, for 45 minutes, butene-2, butadiene-1,3, hydrogen chloride, and air at approximate rates of 150 ml./min., 222 ml./min., 800 ml./min. and 1000 ml./min., respectively, were passed successively through rotameters into a mixer and preheater then into the reactor where they were contacted with the fluidized catalyst maintained at a temperature of about 265° C. to 270° C. As the reactants were introduced, the flow of nitrogen was proportionately reduced so that the velocity of the entering gaseous reactants helped to maintain the catalyst in a fluidized state.

Effluent gases from the top of the reactor were passed through a separator filled with glass wool for removal of any entrained catalyst particles, thence into a series of Dry Ice traps and finally through a caustic scrubber for removal of HCl. Off-gas from the scrubber was vented through a wet test meter.

The recovered product (approximately 37 g.), after washing with water and filtering, was subjected to infrared analysis and found to contain only 1,4-dichlorobutene-2 and 3,4-dichlorobutene-1. The infrared spectra of the low-boiling material collected (33 ml. at —60° C.) indicated that it contained about 27% butadiene-1,3 with the remainder being butene-2.

Example 2

The experiment of Example 1 was repeated using flow rates of 800 ml./min. of butene-2, 200 ml./min. of butadiene, 600 ml./min. of HCl and 1000 ml./min. of air and maintaining the reaction temperature in the range from 250° C. to 270° C. for a period of about 20 min. The product collected from the traps, after distilling off excess hydrocarbon and washing with water, was analyzed both by infrared and gas chromatographic methods and found to contain no dichlorobutanes or any other product which would indicate that the butene had been chlorinated.

After the 20-minute reaction period, the temperature in the reactor was increased to 300° C.–330° C. and the gases were passed into the reactor at the same rates for about a five-minute period. Thereafter, the rates were changed so that 800 ml./min. of butene-2, 200 ml./min. of butadiene, 400 ml./min. of HCl and 500 ml./min. of air were fed to the reactor for a period of about ten minutes. Again the product was recovered and analyzed. An infrared scan showed that no dichlorobutanes and no compounds containing the $CH_3$ group were present while a gas chromatograph verified that only butadiene had entered into the reaction.

Example 3

Using the same apparatus, catalyst, and procedure described in Example 1, butene-1, butadiene-1,3, HCl and air were fed at rates of 800 ml./min., 200 ml./min., 600 ml./min., and 1000 ml./min., respectively, to the reactor with the reaction temperature maintained at about 280° C.–330° C. The liquid product collected was analyzed by gas chromatographic and infrared means. The spectra established that the compounds formed all resulted from the chlorination of butadiene. No peaks other than those obtained with butadiene chlorination were observed. The infrared spectra also showed that no $CH_3$ group was present in the product.

Variations in conditions from those given in the example may be made without departing from the scope of the invention. The reaction may be carried out by mixing the $C_4$ hydrocarbons with hydrogen chloride and air (or oxygen) and passing the mixture in contact with the catalyst in a heated reaction chamber; or if desired, the mixture may be introduced into the reaction zone in three separate streams; or the air or oxygen may be introduced into a mixture of the hydrocarbons and hydrogen chloride. Precaution should be taken to avoid allowing the mixture of butadiene and butenes and oxygen to reach reaction temperature in the absence of hydrogen chloride.

In the preferred embodiment of the invention, the catalyst is employed in the fluidized or pseudo liquid state. It is maintained in a fluid or suspended state by the gaseous reactants themselves or, optionally, by the use of an additional inert gas introduced from an outside source. The use of a fixed bed operation, however, is not outside the scope of the invention.

The relative proportions of the reactants may vary considerably. Since the butenes are not reacted, the reactant proportions are based on the butadiene contained in the hydrocarbon mixture. Preferred proportions are the stochiometric proportions required to effect chlorination of the contained butadiene, i.e., two moles of hydrogen chloride and 0.5 mole of oxygen (or 2.5 moles of air) are fed for every mole of butadiene contained in the gaseous hydrocarbon mixture. However, slight excesses of any or all of the reactants may be employed, if desired, without significantly affecting the reaction. The ratio of butene to butadiene in the hydrocarbon mixture is not critical. It may vary from 0.1:1 to 10:1 or even higher provided feed rates are regulated so as to permit the butadiene to be chlorinated at the same rate as it would be if in a pure condition, or expressed in another way, the rate at which butadiene is fed must be in excess of the rate of reaction of butadiene with the catalyst in units of volume per unit time.

Reaction temperature is a critical variable and the temperature must be maintained within the range from 220° C. to about 400° C. Preferably, the temperature of the reaction is controlled within the range from about 260° C. to about 330° C.

The catalyst of the process is readily prepared by saturating pumice with a solution, aqueous or otherwise, of cupric chloride, filtering, and drying the impregnated pumice. Further drying may be effected by means of a flow of nitrogen (or other inert gas), hydrogen chloride and/or air through the mass while it is being heated to reaction temperature after it has been charged to the reactor. A more active catalyst can be prepared from a methanolic solution of the cupric chloride. Some carbonization of the catalyst occurs during the reaction but the catalyst can be readily reactivated or regenerated by treating with air and HCl at temperatures from 260° C. to 400° C.

What is claimed is:

1. The method for selectively chlorinating butadiene in a mixture containing butadiene and butenes which comprises reacting said butadiene-containing mixture with hydrogen chloride and oxygen in contact with a catalyst consisting essentially of cupric chloride supported upon pumice at a temperature within the range from about 220° C. to about 400° C.

2. The method for selectively chlorinating butadiene in a mixture containing butadiene and butene-2 which comprises reacting said butadiene-containing mixture with hydrogen chloride and oxygen in contact with a catalyst consisting essentially of cupric chloride supported upon pumice at a temperature within the range from about 260° C. to about 330° C.

3. The method for selectively chlorinating butadiene in a mixture containing butadiene and butene-1 which comprises reacting said butadiene-containing mixture with hydrogen chloride and oxygen in contact with a catalyst consisting essentially of cupric chloride supported upon pumice at a temperature within the range from about 280° C. to about 330° C.

References Cited in the file of this patent

UNITED STATES PATENTS 2,308,489   Cass _____ Jan. 19, 1943

FOREIGN PATENTS 798,393   Great Britain _____ July 23, 1958